June 20, 1944.   E. J. MATEJCIK ET AL   2,352,110
MILLING MACHINE ATTACHMENT
Filed April 29, 1943   2 Sheets-Sheet 1

INVENTORS
Edward J. Matejcik
William J. Peppers
BY

June 20, 1944.  E. J. MATEJCIK ET AL  2,352,110
MILLING MACHINE ATTACHMENT
Filed April 29, 1943   2 Sheets-Sheet 2

INVENTORS
Edward J. Matejcik
William J. Teppers
BY

Patented June 20, 1944

2,352,110

UNITED STATES PATENT OFFICE 2,352,110

MILLING MACHINE ATTACHMENT

Edward J. Matejcik and William J. Peppers, Detroit, Mich.

Application April 29, 1943, Serial No. 485,028

5 Claims. (Cl. 90—17)

This invention relates to improvements in milling machine attachments and refers particularly to an attachment for use on milling machines wherein the table is not mounted for angular adjustment relative to the axis of the arbor. It is an object of the invention to provide such an attachment including a single mounting to be secured to an overarm for supporting an arbor extension horizontally at any desired inclination to the main arbor, so that a milling cutter on the arbor extension may be positioned to operate at any inclination to the path of movement of the table while the latter is either stationary or being reciprocated in the conventional manner, and while work upon the table is either held still or is reciprocated by conventional means.

Another object of the invention is to provide such a milling machine attachment including an intermediate shaft for imparting a drive from the main arbor either directly to the arbor extension or through a horizontal stub shaft positioned at right angles to the arbor extension and connected thereto through gearing. Thus if the inclination of the arbor extension to the main arbor is less than 45 degrees the former arrangement is employed, and if the inclination of these parts to one another is more than 45 degrees the drive through the stub shaft is utilized, so that whatever the inclination of the cutter axis is relative to the axis of the main arbor the inclination of the intermediate shaft to the latter is never excessive.

Having thus briefly stated some of the objects and advantages of the invention I will now proceed to describe it in detail with the aid of the accompanying drawings, in which:

Figure 4 is a partial front elevation showing the invention.

Figure 1:
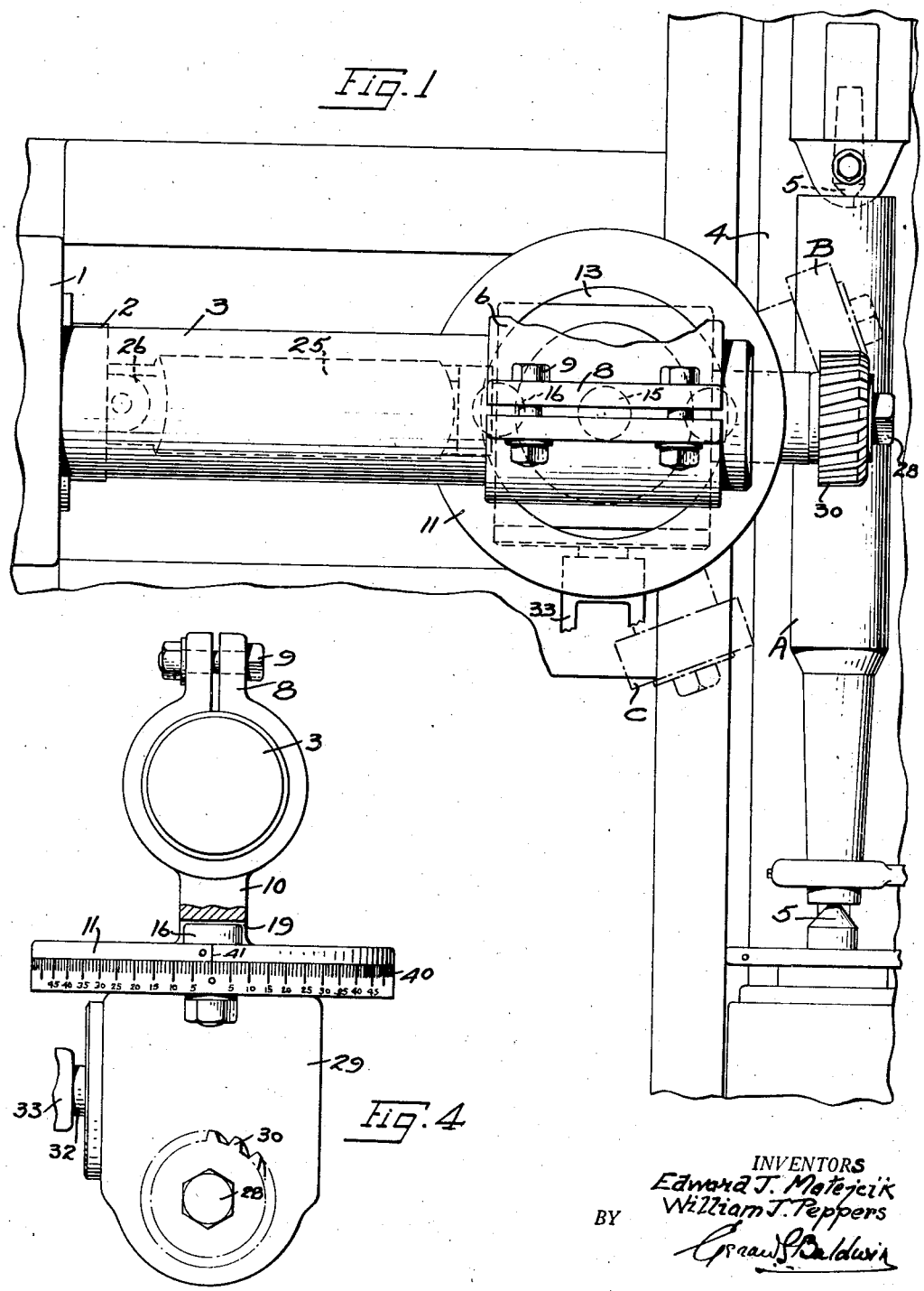
Figure 1 illustrates a plan view of a portion of a milling machine with the invention mounted thereon.

Referring to the drawings, I designates an upright of a conventional milling machine which supports an ordinary main arbor 2 for rotation. Projecting also from the upright I above the main arbor 2 and usually in vertical alignment therewith is an overarm 3. The table 4 of the machine is mounted for reciprocation in the usual manner at right angles to the axis of the main arbor. Conventional means—not shown— are also employed for imparting a rotary feed to the work A supported between centers 5 on the table 4.

6 denotes a mounting provided at its upper extremity with a socket 7 which extends around the overarm 3 and is held immovable thereon. In the present instance the socket 7 is radially split and provided with opposed flanges 8 at its split extremities through which bolts 9 extend. Formed integral with the mounting 6 and connected thereto by a downwardly extending web 10 is a circular guide 11 the underside of which is horizontal and is counterbored at 12 from its underside, and formed through the circular guide 11 is a concentric annular slot 13. Supported against the lower face of the guide 11 is a rotary disc 14 having a concentric upwardly projection 15 thereon which extends into the counterbore 12 and is rotatable therein, and supporting the disc 14 are bolts 16 which extend downwardly through the guide slot 13 and through apertures 17 formed through the said disc and have nuts 18 on their lower extremities. Formed also through the web 10 are transverse apertures 19 to permit the passage of the heads of the bolts 16 therethrough when the latter are turned with the disc 14 about the axis of the guide 11. Formed integral with the disc 14 and projecing downwardly herefrom is a housing 20.

Supported horizontally in suitable bearings 21 carried in the housing 20, preferably in the lower part of the latter, is an arbor extension 22 which projects at both extremities beyond the said housing. Provided on one extremity of the extension 22 is a universal coupling portion 23 which may be secured to a cooperating coupling portion 24 on one extremity of an intermediate shaft 25, and the opposite ends of the latter is connected through another universal coupling portion 26 to the main arbor 2. The opposite extremity of the arbor extension 22 is provided with means for supporting any preferred form of milling cutter, either end or side mill. In the present instance a receiving head 27 is mounted upon the arbor extension 22 and a cutter 30 is secured thereon by means of a screw 28 and washer 29. Thus, as shown in Figure 2, when the universal coupling portions 23 and 24 are connected to one another the arbor extension is directly driven from the main arbor 2.

Supported horizontally in bearings 31 provided in the housing 20, in the present instance above the arbor extension 22, is a horizontal stub shaft 32 which extends at right angles to the arbor extension and has a universal coupling portion 33 secured on one extremity which projects beyond the housing. Secured also around the stub shaft 32 between the bearings 31 is a helical gear 34 which meshes with a second helical gear 35 fixed in the arbor extension 22 between its bearings 21. Thus if the inclination of the arbor extension 22 is more than 45 degrees to the main arbor 2 the coupling portion 33 on the stub shaft 32 is connected to the coupling portion 24 on the intermediate shaft 25 so that the greater the inclination of the cutter axis beyond 45 degrees relative to the main arbor the less the inclination of the intermediate shaft 25 relative to the latter.

As the inclination of the arbor extension 22 or the stub shaft 32, whichever is connected to the intermediate shaft 25, increases so also the length of the intermediate shaft 25 must increase. To provide for this the intermediate shaft is made telescopic, and consists of a sleeve 36 to which the coupling portion 24 is secured and axially movable in the sleeve is an inner shaft 37 to which one extremity of the universal coupling 26 is secured. A key 38 is provided for preventing independent rotation of the sleeve relative to the inner shaft.

Figure 2:
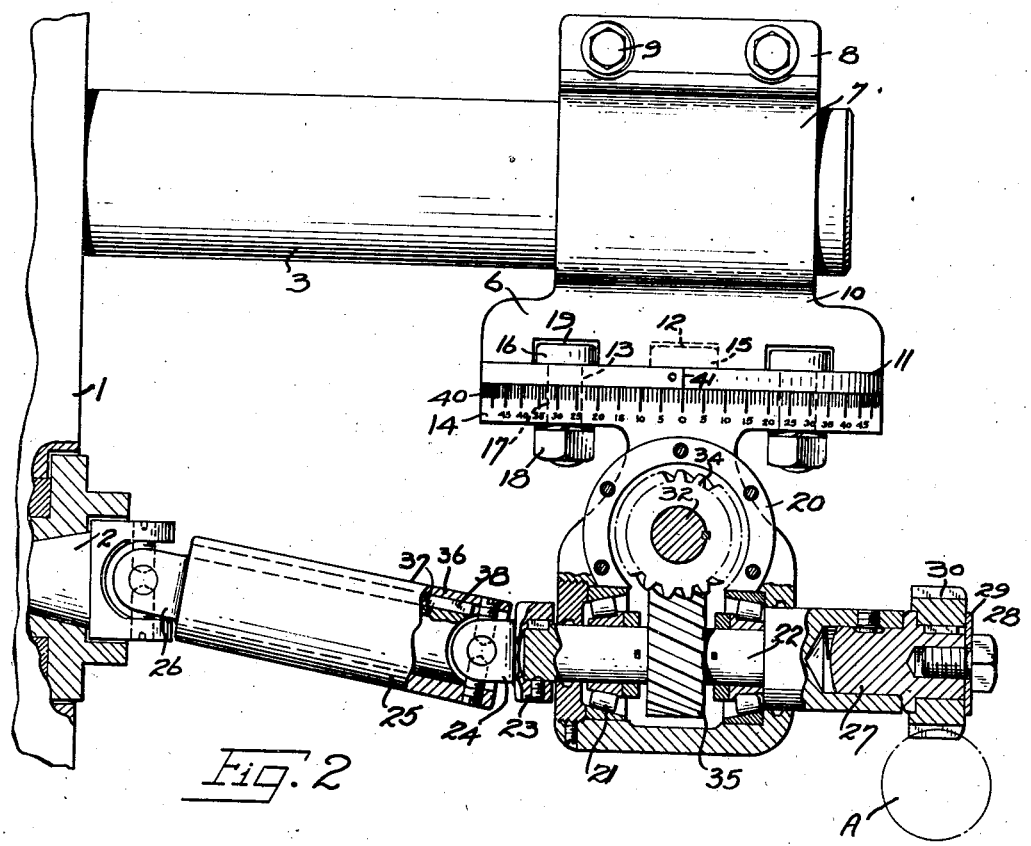
Figure 2 is a side view partly in section showing the intermediate shaft connecting the main arbor to the extension.
Figure 3:
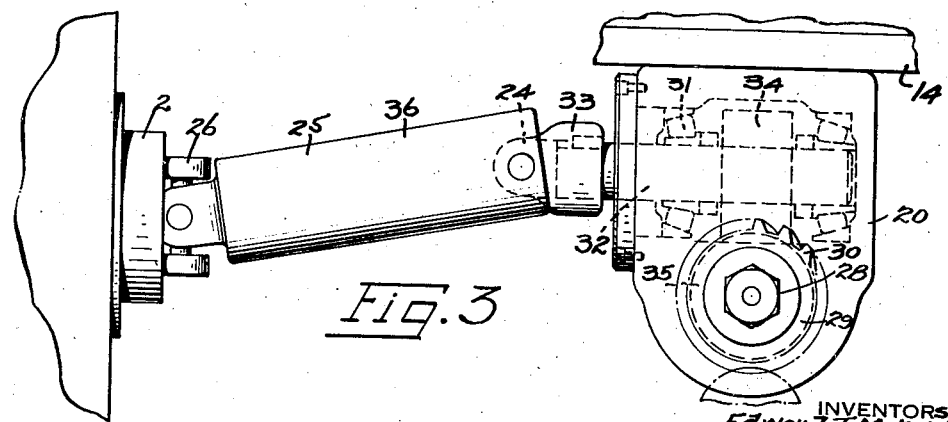
Figure 3 is a side view showing the intermediate shaft connecting the main arbor to the stub shaft through which the arbor extension is driven.

If the cutter 30 is to be rotated at substantially the inclination shown at B in Figure 1 this is obviously preferably accomplished by connecting the intermediate shaft 25 directly to the arbor extension 22 as shown in Figure 2, whereas if the cutter is to be operated at substantially the position shown at C in Figure 1 this is preferably done by connecting the intermediate shaft 25 to the stub shaft 32 as shown in Figure 3. Thus it is apparent that by the proper selection of the coupling portion 23 or 33 to which the coupling portion 24 on the intermediate shaft 25 is secured a satisfactory drive may be provided for the arbor extension irrespective of its inclination to the main arbor 2. To facilitate the rotary setting of the housing 20 relative to the guide 11 a graduated scale 40 is provided around the rotary disc 14 which registers with index marks 41 upon the guide.

While the preferred embodiment of the invention has been described and shown it is understood that alterations and modifications may be made thereto provided they fall within the scope of the appended claims.

What we claim is:

1. A milling machine attachment including a mounting to be secured to an overarm, a circular guide integral with the mounting, a disc mounted on the guide for rotary adjustment, a housing integral with the disc, horizontally aligned bearings in the housing, an arbor extension supported therein having means on one extremity for securing a milling cutter thereto, an intermediate shaft having a universal coupling on one extremity for attachment to a main arbor, a horizontal stub shaft rotatably supported by the housing at an inclination to the arbor extension, means for driving the latter by rotation of the stub shaft, a universal coupling portion on one extremity of the stub shaft, an intermediate shaft of variable length having a universal coupling on one extremity for attachment to a main arbor, and a coupling portion on its other extremity for attachment to the first named coupling portion.

2. A milling machine attachment including a mounting to be secured to an overarm, a circular guide integral with the mounting and having its axis vertically disposed, a disc dependingly mounted on the guide for rotary adjustment, a housing integral with the disc, horizontal bearings in the housing, an arbor extension rotatably supported in the bearings, means on one extremity of the arbor extension for securing a milling cutter thereon, a universal coupling portion on the other extremity of the arbor extension, a horizontal stub shaft mounted for rotation in the housing at an inclination to the arbor extension, means for turning the latter by rotation of the stub shaft, a universal coupling portion on the stub shaft, an intermediate shaft of variable length having a universal coupling on one extremity for attachment to a main arbor, and a coupling portion on its other extremity for attachment to either of the above mentioned coupling portions.

3. A milling machine attachment including a horizontal guide, means for securing the guide to an overarm, a disc mounted for rotary adjustment about a vertical axis dependingly supported by the guide, said guide and disc having coacting graduations thereon for setting the latter angularly relative to the former, a housing integral with the disc, an arbor extension supported for rotation about a horizontal axis by said housing, a stub shaft angularly disposed to said extension rotatably supported about a horizontal axis by said housing, coacting gearing on the stub shaft and arbor extension, an intermediate shaft of variable length having a universal coupling portion on one extremity for attachment to a main arbor, means on the other extremity of the intermediate shaft for attaching it either to the stub shaft or to the arbor extension, and means on one extremity of the arbor extension for securing a milling cutter thereon.

4. A milling machine attachment including a horizontal guide, means for securing the latter to an overarm, a disc mounted for rotary adjustment about a vertical axis supported by the guide, said disc and guide having coacting graduations thereon for setting the former angularly relative to the latter, a housing integral with the disc, an arbor extension supported for rotation about a horizontal axis by the housing, a stub shaft angularly disposed to said arbor extension and supported about a horizontal axis by said housing, coacting gearing on the stub shaft and arbor extension, a telescopic intermediate shaft having a universal coupling on one extremity for attachment to a main arbor, a universal coupling portion on the other extremity of the intermediate shaft, a coupling portion on one end of the stub shaft, a coupling portion on one extremity of the arbor extension, the first named coupling portion being adapted to be secured to either of the two latter coupling portions, and means on the other extremity of the arbor extension for securing a milling cutter thereon.

5. A milling machine attachment including a mounting to be secured to an overarm, a circular guide depending therefrom and having a circular slot therein, the axis of the guide and the slot being vertical, a disc, means supporting the latter for rotary adjustment beneath the guide including bolts extending through the disc and said slot, a housing on the disc having vertically spaced sets of horizontal bearings therein, the sets of bearings being disposed at right angles to one another, a stub shaft mounted in one set of bearings, an arbor extension mounted in the other set of bearings, means for driving the arbor extension from the stub shaft, means on one extremity of the arbor extension for securing a milling cutter thereon, a telescopic intermediate shaft having means on one extremity for attachment to a main arbor, and means on its other extremity for attachment to either the stub shaft or the arbor extension.

EDWARD J. MATEJCIK.
WILLIAM J. PEPPERS.